United States Patent Office 3,392,091
Patented July 9, 1968

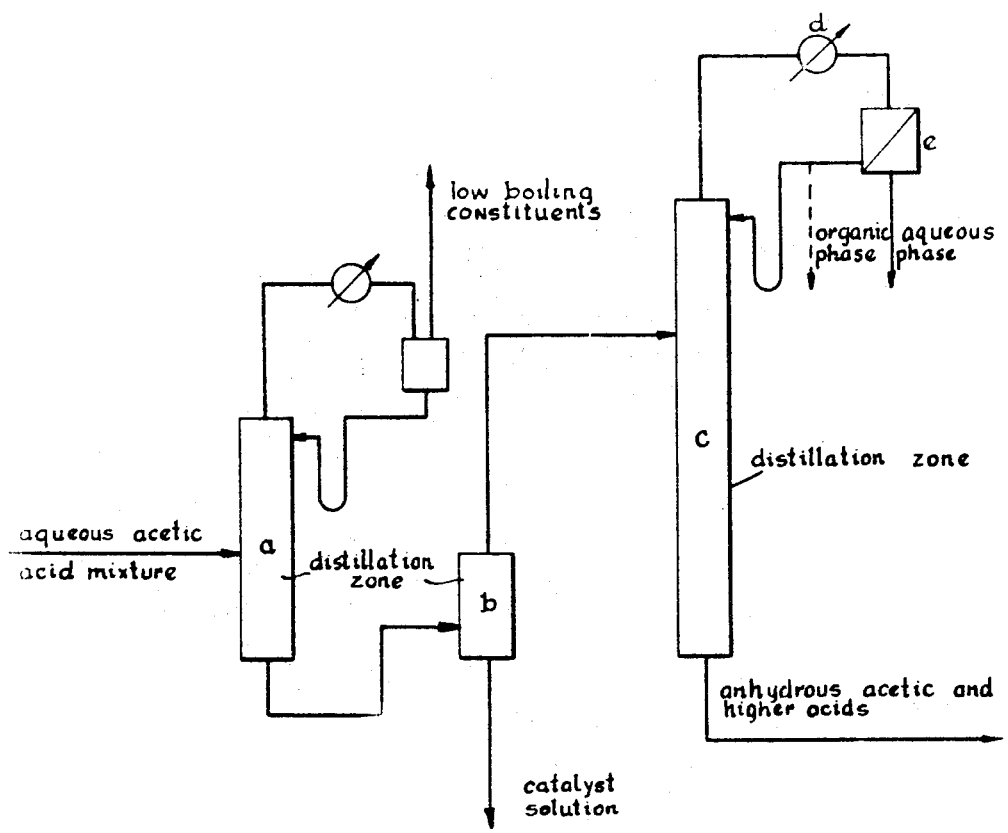

3,392,091
DISTILLATION OF AQUEOUS ACETIC ACID IN PRESENCE OF WATER ENTRAINING BY-PRODUCTS
Heinz Hohenschutz, Mannheim, Germany, assignor to Badische Anilin- & Soda-Fabrik Aktiengesellschaft, Ludwigshafen (Rhine), Germany
No Drawing. Filed July 7, 1964, Ser. No. 380,917
Claims priority, application Germany, July 13, 1963, B 72,675
4 Claims. (Cl. 203—71)

ABSTRACT OF THE DISCLOSURE

A process for recovering anhydrous acetic acid from aqueous solutions that are formed in the catalytic reaction of methanol with carbon monoxide in the presence of water. In the process a portion of the low-boiling constituents of the solution are removed in a first distillation step. The quantity of low-boiling constituents removed is regulated so that the amount of organic phase of the condensate from a subsequent distillation stage remains substantially constant. The organic phase of said condensate includes higher boiling constituents as well as said low-boiling constituents. The higher boiling constituents form an azeotrope with water thereby causing a separation of the water from the acetic acid. One of the advantages of the process is that no additional extractant or entrainer need be added to the solution. The process makes it possible to recover anhydrous acetic acid with a minimum expenditure of energy.

---

This invention relates to a new process for working up mixtures containing acetic acid such as are obtained in the carbonylation of methanol.

A number of methods is known for the production of acetic acid in which the acetic acid is obtained in aqueous solution and mixed with numerous other substances, which are, however, usually present in minor amounts. One of these methods is the catalytic reaction of methanol with carbon monoxide in the presence of water.

Separation of such mixtures offers technical difficulties. In particular it is not easy to recover the acetic acid in anhydrous form because the vapor pressure curves of acetic acid and of water proceed unfavorably for such a separation. Since acetic acid and water do not form an azeotrope, it is possible in principle to effect separation, but in fact very efficient columns having far more than one hundred theoretical trays are necessary and a very high reflux ratio must be used. Energy requirement is accordingly high. Many proposals have therefore been made for the recovery of anhydrous acetic acid from dilute aqueous solutions. Thus methods have been described in which the acetic acid is separated by extraction with a solvent which is not miscible with water (see for example German patent specification No. 927,628). In another method, extraction is combined with azeotropic distillation (see U.S. Patent No. 2,395,010). Furthermore a number of methods has become known in which dehydration is effected merely by azeotropic distillation. In general the entrainers recommended are esters, if desired with an alcohol (see for example U.S. Patents Nos. 3,052,610 and 2,854,385). In another known method for distillative dehydration of acetic acid, an ester is used as the entrainer and a hydrocarbon as an auxiliary entrainer (see U.S. Patent No. 2,854,385). It is a common feature of all prior art methods that an additional extractant or entrainer is required. Additional costs are therefore involved in the provision of the entrainer or extractant and to cover the loss of entrainer and extractant. Moreover an additional column is required in which the entrainer or extractant dissolved in the water can be recovered by distillation.

It is an object of this invention to provide a process by which anhydrous acetic acid and may be recovered from aqueous reaction mixtures without the use of an extraction agent. Another object of this invention is to provide such a process which will operate without adding an entrainer. A further object of this invention is to provide a process by which anhydrous acetic acid may be separated from aqueous reaction mixtures with minimum expenditure of energy. Yet another object of the invention is to provide a process for the recovery of anhydrous acetic acid from aqueous reaction mixtures in which there is a constant rate of energy consumption, i.e. independent of incidental fluctuations in the composition of the reaction mixture. Other objects of the invention will become evident from the following description.

In accordance with this invention, the said objects and advantages are achieved and mixtures containing acetic acid which have been obtained by reaction of methanol and if desired methyl acetate and/or dimethyl ether with carbon monoxide in the presence of water and a carbonyl-forming metal of group VIII of the Periodic System of Elements and a halogen compound as a catalyst under superatmospheric pressure and at elevated temperature, are advantageously processed by (a) Distilling off a portion of the low boiling constituents of the mixture in a first distillation;

(b) In a second distillation driving off from the residue from the first distillation the bulk of the distillable constituents so that the catalyst is withdrawn as a residue in an enriched aqueous acetic acid solution;

(c) Introducing the constituents expelled in the second distillation, advantageously in vapor phase, into a third distillation in which the water is separated in the form of a readily volatile azeotrope with constituents of higher boiling point formed in the reaction;

(d) Condensing this readily volatilizable mixture and the low-boiling constituents not separated in the first distillation and distilled over the top in the third distillation;

(e) Withdrawing the aqueous phase of the condensate and using the organic phase at least in part as a reflux wihle a practically anhydrous residue mainly consisting of acetic acid is withdrawn from the third distillation; the amount of low-boiling constituents separated in the first distillation being such that the remainder of the low-boiling constituents remaining in the residue from the first distillation together wth the said high-boiling constituents is sufficient to provide in the condensation of the said azeotrope and of the said residue of the low-boiling constituents in the third distillation at least as much organic phase as is required as a reflux in the third distillation.

Owing to the most important feature of the process according to the invention, namely regulation of the amount of organic phase of the condensate in the third distillation by withdrawal of a definite amount of the low-boiling constituents of the mixture in the first distillation, it is possible to process the said mixtures containing acetic acid more economically than hitherto. No extraneous entrainer is required and nevertheless only relatively low distillation costs are involved. Moreover the compounds whose boiling point in the anhydrous condition is in the neighborhood of that of acetic acid and which therefore cannot be separated at all or can only be separated with great difficulty in the absence of water, are removed in the third distillation as an azeotrope with water from the acetic acid. This is particularly the case with 2-ethyl-butene-(2)-al-(1) whose boiling point at 117° C. is only about 1° C. below that of acetic acid, and with n-butyl acetate having a boiling point of 127° C.

These advantages are obtained however only by making use of the said regulation of the amount of organic phase of the condensate in the third distillation stage. If too much low-boiling constituents are removed in the first distillation, the amount of higher boiling constituents in the third distillation is not sufficient to form and maintain a separate phase in the condensation of the readily volatile mixture containing water. The higher boiling constituents, dissolved in water, are then carried away so that the mixture in the third distillation stage becomes impoverished in higher boiling constituents, i.e. in entrainer. After a short time there is then not sufficient organic phase available for the reflux and acetic acid passes into the distillate in considerable amounts. If on the other hand too little low-boiling constituents are removed from the mixture in the first distillation, the organic phase in the condensate of the third distillation increases steadily so that only a portion of it can be used as reflux. In this case also, a portion of the higher boiling constituents is carried forward from the third distillation and the content of higher boiling constituents in the reflux is diminished in favor of low-boiling constituents which have no appreciably entraining power. It is then necessary to recycle more organic phase as reflux in order to avoid an increase in the acetic acid content in the condensate of the third distillation. While satisfactory separation of water is thus achieved, the consumption of energy is higher.

In general the amount of low-boiling constituents removed in the first distillation is such that optimum conditions are present for the dehydration in the third distillation, these conditions being achieved when the amount of organic phase of the condensate remains constant. In this case satisfactory separation of water and acetic acid is achieved with a minimum expenditure of energy.

Sometimes however it is desirable to operate the third distillation not with a minimum but with a constant supply of energy. Under the conditions of carbonylation the constituents serving as entrainer are not always formed in the same amounts and with the same composition. The entrain power of these constituents therefore varies. If the third distillation is to be operated always with minimum expenditure of energy, the supply of energy must constantly be adapted to the content of higher boiling constituents in the mixture being processed. Instead of this it is sometimes better to supply a constant amount of energy which is more than the minimum requirement. If the additional supply of energy were to be taken account of merely by increasing the amount of reflux, a larger amount of higher boiling entrainer would be supplied to the column with the reflux than the amount of water to be removed. That portion of the entrainer boiling at a higher temperature than acetic acid, for which no water is available to form an azeotrope, would then pass with the acetic acid to the still of the third distillation. Since this higher boiling entrainer, such as 2-ethylbutene-(2)-al-(1), is very difficult to separate from the acetic acid and in part cannot be removed therefrom in the subsequent distillation for the recovery of pure acetic acid, the result of any change in loading is a considerable deterioration in the product. Account is therefore taken of the extra energy supplied beyond the minimum amount by decreasing the amount of readily volatile constituents which are withdrawn in the first distillation, and withdrawing a larger proportion of the organic phase of the condensate in the third distillation.

The said regulation principle is also of great use if the amount of the mixture containing acetic acid is temporarily decreased. It is known that distillation columns cannot be operated with any low expenditure of energy. If the amount of mixture decreases, less readily volatile constituents are separated in the first distillation so that the effective entrainer of higher boiling point is more strongly diluted with low-boiling compounds. In the third distillation the reflux can then be increased without the higher boiling entrainer (which is difficult to separate from acetic acid) passing into the bottom of the still. The energy expenditure per kg. of anhydrous acetic acid is then greater than with normal loading of the processing system, but in this way small amounts of mixture may be processed which normally would have to be separated in smaller apparatus.

The mixture containing acetic acid which is to be processed by the new process is prepared in the conventional way by carbonylation of methanol. This method is not the subject of the present invention. The carbonylation is carried out in the presence of water. It is advantageous to return to the process the methyl acetate which is formed in the course of the reaction. Moreover a considerable proportion of dimethyl ether may be coemployed as initial material. The carbonylation is in general carried out at temperatures between 180° and 350° C. and at pressures of from 200 to 700 atmospheres.

The various steps of the process are shown in the attached schematic drawing.

In the drawing low-boiling constituents of the mixture to be separated are partly removed in the first distillation (column $a$). The amount of low-boiling constituents to be removed depends, as explained, on the conditions prevailing in the third distillation. It is in general between 5 and 20%. By low-boiling constituents we understand those which alone have a boiling point below 80° C., at atmospheric pressure. The main constituent of the low-boiling constituents is methyl acetate which is generally present in the mixture to be separated in amounts of 10 to 20% by weight. Other components of the low-boiling constituents are n-butyraldehyde, ethyl acetate, dimethyl ether, acetaldehyde and methyl iodide. Gases dissolved in the initial mixture, particularly carbon dioxide and methane, are also substantially removed in the first distillation. The low-boiling constituents are partly condensed and the liquid phase is partly returned as a reflux to the first distillation. The remainder of the condensed low-boiling constituents and the low-boiling constituents which remain gaseous are withdrawn from the column. The first distillation is carried out in conventional columns, i.e. packed columns, sieve-plate columns or bubble tray columns. The pressure is advantageously between 1 and 15 atmospheres. The transition temperature is between 50° and 60° C. at atmospheric pressure.

In a second distillation (column $b$), the catalyst is separated from the residue of the first distillation by expelling the bulk of the distillable constituents. It is recommendable to carry out the separation of the catalyst prior to the dehydration of the acetic acid. The catalyst, which is in general present in the initial mixture in a concentration of 0.5 to 2% by weight, is advantageously withdrawn from the second distillation in the form of a 10 to 30% aqueous acetic acid solution. This solution usually represents 5 to 15% by weight of the mixture introduced into the second column. The acetic acid content is usually between 50 and 70% by weight. In the second distillation it is advantageous to use a pressure of from 1 to 1.5 atmospheres. The top temperature at atmospheric temperature is from 100° to 105° C.

In a third distillation (column $c$), into which the constituents driven off from the second distillation are advantageously introduced without previous liquefaction, the acetic acid is then dehydrated, high boiling point constituents of the initial mixture serving as entrainer. This feature is based on the surprising observation that high-boiling constituents formed during the carbonylation reaction are capable of assuming the task of an entrainer provided care is taken that sufficient low-boiling constituents of the initial mixture are present in the third distillation to ensure that sufficient organic phase is obtained in the third distillation. The higher boiling constituents are substances which boil at atmospheric pressure above 80° C. and form with water azeotropes whose boiling point is between 70° and 95° C. Examples of these substances are n-butyl acetate, 2-ethylbutyl acetate, 2-ethylhexyl acetate, 2-ethylbutene-(2)-al-(1) and 2-ethylbutanal-(1). The third distillation is advantageously carried out under the same pressure as the first two. The top temperature at atmospheric pressure is in general between 78° and 88° C.

The residue from the third distillation is an acetic acid which is practically free from water. It contains small amounts, i.e. 2 to 6% by weight, of readily separable constituents having a higher boiling point than acetic acid, such as propionic acid, and may be processed into pure acetic acid in another distillation.

The third distillation is also carried out in a conventional column. The design of this column c depends substantially on the requirements placed on the separation. For example if importance is attached to obtaining a practically anhydrous acetic acid, while 2 to 5% of acetic acid will be tolerated in the condensate of the third distillation, the column used may be one having about thirty theoretical plates.

It will be appreciated that it is not possible to give absolute statements regarding the amount of readily volatile constituents which is to be withdrawn in the first distillation. It depends substantially on the nature and amount of the constituents of higher boiling point formed during the carbonylation reaction. According to the fluctuation in the nature and amount of the higher boiling constituents and therefore in the entraining power of the entrainer in the third distillation, the amount of readily volatile constituents withdrawn in the first distillation must be varied. In any case sufficient readily volatile constituents should be left in the residue of the distillation to ensure that an organic phase remains in the condensate of the third distillation.

The process according to the invention is illustrated in greater detail in the following example.

Example

A mixture containing acetic acid, which has been obtained by carbonylation of a mixture of methanol and dimethyl ether while returning methyl acetate and which contains 50% of acetic acid, 25% of water, 2% of catalyst, 15% of methyl acetate, 4% of other low-boiling constituents and 4% of higher boiling constituents and compounds having a higher boiling point than acetic acid, is processed continuously. 1000 kg. per hour of the mixture is passed into a first column and 120 kg. per hour of low-boiling constituents is distilled off. Of this 120 kg. of low-boiling constituents, 80 kg. is methyl acetate and the remainder consists mainly of n-butyraldehyde, acetaldehyde and dimethyl ether.

The residue from the first distillation—880 kg. per hour—is transferred to a distilling column and substantially evaporated therein. From the bottom of this distilling column there are drawn off per hour 20 kg. of catalyst dissolved in 80 kg. of aqueous acetic acid.

780 kg. per hour of the mixture vaporized in the distilling column is passed into a dehydrating column. At the top of this column, the vapors of the azeotrope of water and high-boiling constituents, and also the low-boiling constituents not separated in the first column are condensed (condenser d) and separated into two layers in a separating vessel e. The upper layer consists of 35% of methyl acetate and butyraldehyde, 30% of ethyl acetate and butyl acetate, 15% of ethylbutenal and ethylbutanal, 6% of water, 5% of acetic acid and formic acid and small amounts of other compounds. The amount of this upper layer is practically constant and is returned to the distillation as a reflux. The lower layer contains 68.5% of water, 21% of methyl acetate, 7.5% of higher boiling constituents and 3% of acetic acid, 35 parts per hour of this aqueous layer is withdrawn.

445 parts per hour of anhydrous acetic acid is drawn off from the bottom of the column; this contains 3.4% of by-products. The steam consumption in the third distillation is 1.4 kg. of steam per kg. of anhydrous acetic acid.

If the above procedure be followed but only 40 parts of methyl acetate per hour is withdrawn in the first column, the upper layer of condensate in the third distillation contains 50% of methyl acetate instead of 35%. The volume of this layer increases markedly so that a considerable amount has to be drawn off. The steam consumption for the third distillation in this case is 2.1 kg. of steam per kg. of anhydrous acetic acid.

I claim:

1. In a process for working up aqueous mixtures containing acetic acid which have been obtained by reaction of methanol with carbon monoxide in the presence of water and a compound of a carbonyl-forming metal of group VIII of the Periodic System of Elements and a halogen compound as catalyst under superatmospheric pressure and at elevated temperature, said mixture including methyl acetate, n-butyraldehyde, ethyl acetate, dimethyl ether, acetaldehyde, methyl iodide, n-butyl acetate, 2-ethylbutyl acetate, 2-ethylhexyl acetate, 2-ethylbuten-(2)-al-(1) and 2-ethylbutanal-(1), the improvement which comprises:
    (a) distilling off a portion of the constituents of the mixture having a boiling point below 80° C. at atmospheric pressure (low boiling constituents) in a first distillation, said constituents including methyl acetate, n-butyraldehyde, ethyl acetate, dimethyl ether, acetaldehyde and methyl iodide;
    (b) driving off all of the residue from the first distillation in a second distillation except an enriched aqueous acetic acid catalyst solution which is withdrawn as a residue;
    (c) introducing the constituents expelled in the second distillation into a third distillation in which the water is separated in the form of a readily volatile azeotrope with constituents formed in said reaction having a boiling point above 80° C. at atmospheric pressure, said constituents including n-butyl acetate, 2-ethylbutyl acetate, 2-ethylhexyl acetate, 2-ethylbuten-(2)-al-(1) and 2-ethylbutanal-(1);
    (d) condensing this readily volatile azeotrope and the low-boiling constituents not separated in the first distillation and distilled over the top in the third distillation;
    (e) separating the condensate into an aqueous and an organic phase;
    (f) withdrawing the aqueous phase of the condensate;
    (g) using at least a portion of the organic phase as a reflux; and
    (h) withdrawing the residue from the third distillation; the amount of low-boiling constituents separated in the first distillation being such that the low-boiling constituents remaining in the residue from the first distillation together with the said higher boiling constituents is sufficient to provide in the condensation of the said azeotrope and of the said remainder of the low-boiling constituents in the third distillation at least as much organic phase as is required as a reflux in the third distillation.

2. A process as claimed in claim 1 wherein the pressure in the three said distillations is between atmospheric pressure and 1.5 atmospheres.

3. A process as claimed in claim 1 wherein in the first distillation the amount of low-boiling constituents drawn off from the initial mixture is such that the amount of the organic phase of the condensate in the third distillation remains constant.

4. A process as claimed in claim 1 wherein the processing of the said mixture containing acetic acid is carried out with the supply of a constant amount of energy by compensating for extra demands for energy beyond the minimum amount by decreasing the amount of readily volatile constituents withdrawn in the first distillation and by drawing off a larger proportion of the organic phase of the condensate in the third distillation.

References Cited

UNITED STATES PATENTS

| | | | |
|---|---|---|---|
| 2,049,441 | 8/1936 | Gordon | 203—16 |
| 2,111,140 | 3/1938 | Coutor | 203—84 |
| 2,395,010 | 2/1946 | Othmer | 260—541 |
| 2,412,215 | 12/1946 | Guinot | 260—541 |
| 2,650,249 | 8/1953 | Mention et al. | 260—541 |
| 2,854,385 | 9/1958 | Alheritiere | 203—16 |
| 2,861,923 | 11/1958 | Elce et al. | 260—541 |
| 2,893,923 | 7/1959 | Luke et al. | 260—541 |
| 2,936,321 | 5/1960 | Mercier | 260—541 |
| 3,060,233 | 10/1962 | Hoenshutz | 260—541 |

WILBUR L. BASCOMB, Jr., *Primary Examiner.*